July 4, 1950            A. S. CANN            2,513,842

PIPE CUTTER

Filed July 10, 1948

INVENTOR.
ARTHUR S. CANN
BY
John J. Hanrahan
ATTORNEY

Patented July 4, 1950

2,513,842

UNITED STATES PATENT OFFICE 2,513,842

PIPE CUTTER

Arthur S. Cann, Milford, Conn.

Application July 10, 1948, Serial No. 38,020

4 Claims. (Cl. 30—96)

This invention relates to new and useful improvements in hand tools and has particular relation to a hand operated pipe cutter.

An object of the invention is to provide a pipe, tube or rod cutter especially adapted for home use and which is of simple and inexpensive construction yet is adapted for a long, useful life.

Other objects and advantages of the invention will become apparent from a consideration of the following detailed description taken in connection with the accompanying drawing wherein satisfactory embodiments of the invention are shown. However, it is to be understood that the invention is not limited to the details disclosed but includes all such variations and modifications as fall within the spirit of the invention and the scope of the appended claims.

Figure 1:
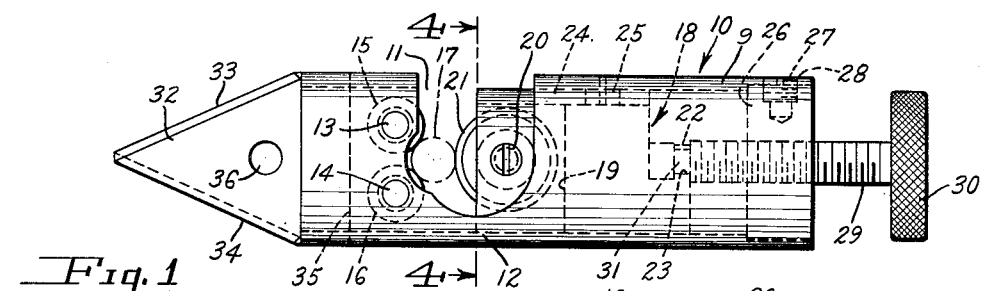
Fig. 1 is a side elevational view showing the pipe cutter of the invention.

Referring in detail to the drawing and at first more particularly to Figs. 1–6 thereof, my improved pipe cutter comprises a cylindrical body generally designated 10 and comprising a suitable length of wrought iron pipe or the like. A notch 11 opens through a side of the body intermediate the ends of the latter and such notch is of considerable depth extending substantially through the body whereby its portions at the respective sides of the notch are connected through only a relatively small portion 12 of the body. It will be understood that the notch 11 is to permit of the disposing of the pipe within the cutter or of the disposing of the cutter on a length of pipe. Here it is noted that while the present tool is referred to as a pipe cutter, the same is useful for the cutting of tubes, rods, etc.

Extending transversely of the body 10 at one side of the notch 11 are a pair of short shafts or studs 13 and 14 located in parallel relation and at their ends supported in the walls of the body 10. These studs 13 and 14 serve to mount broad flat surface rollers 15 and 16 which are turnable on the respective studs. However, it will be understood that should the studs be mounted for rotation, the rollers may be fixed to the studs rather than turn on them as in the present instance.

Figure 2:
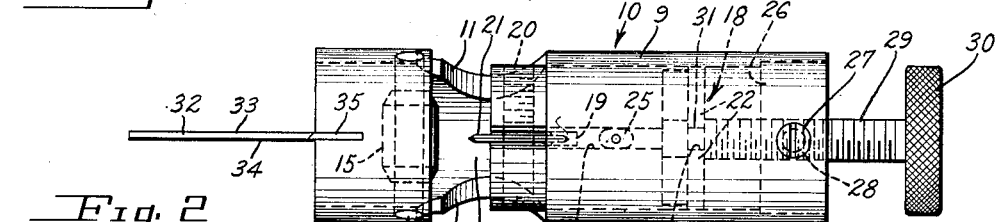
Fig. 2 is a top plan view thereof.
Figure 3:
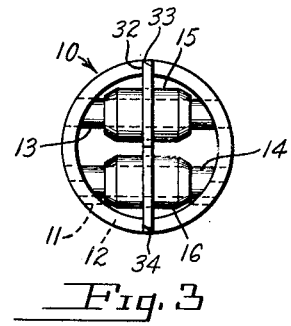
Fig. 3 is an end elevational view of the pipe cutter, the view being taken as looking into the left hand end of Fig. 1.
Figure 4:
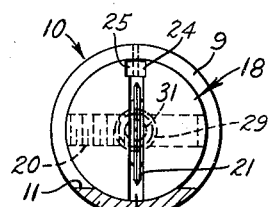
Fig. 4 is a transverse sectional view taken as along the plane of the line 4—4 of Fig. 1.
Figure 5:
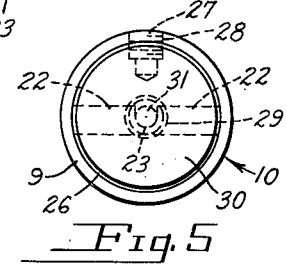
Fig. 5 is a view similar to Fig. 3 but looking toward the opposite end of the pipe cutter.
Figure 6:
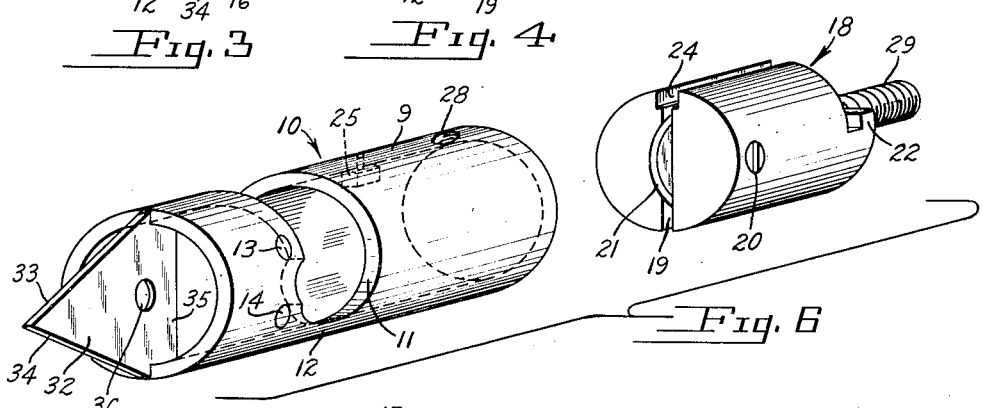
Fig. 6 is a perspective view of certain parts of the pipe cutter.

With particular reference to Figs. 1 and 2 it will be noted that the peripheries of the rollers 15 and 16 extend slightly into the notch 11 adjacent one side of the latter. These rollers are adapted to form a support for the side of a pipe or tube or the like which is to be cut and while any such pipe or tube will be positioned depending on its diameter I have, by broken lines, suggested the position of such a length of pipe in Fig. 1 where such suggested length of pipe is designated 17.

Within the portion 9 of the cylindrical body 10, which portion is located at the side of the notch 11 opposite that mounting the rollers 15 and 16, there is located a transversely circular guide or cutter carrier generally designated 18. Such guide is substantially in the form of a length of bar stock and toward one end is slotted as at 19. A stud 20 carried by the body 18 passes through its portions at opposite sides of the slot 19 and provides the mounting for a rotatable disc cutter 21. The location of the stud 20 and the diameter of the disc cutter 21 are such, relatively, that a portion of said cutter always projects through that end of the carrier facing the rollers 15 and 16.

At its opposite end, the carrier 18 is provided with a flange portion 22 which intermediate its ends and, in fact, midway its ends is notched as at 23. The particular shape and construction or mounting of this flange portion 22 is not important although in the present instance the same is shown as an integral part of the carrier 18. Extending longitudinally of the carrier 18 and opening through one side thereof is a slot or groove 24. In the assembly a flattened pin or the like 25, rigid with the cylindrical body 10 and projecting from the inner side of the latter, is located in said slot 24 whereby to hold the carrier 18 against any movement relative to the body 10 except a movement in the direction of the length of said body or toward and from the rollers 15 and 16.

A closure block 26 in the form of a relatively heavy disc is fitted within the outer or free end of the portion 9 of the cylindrical body 10. Such block may have a tight fit within the cylindrical body and may be secured against movement relative to the latter in any desired way. In the present instance, a screw 27 is shown as threaded through an opening 28 in a wall of the cylindrical body and entering the recess in the plug 26. In this way, the plug is secured against any movement relative to the body 10.

A screw or externally threaded shank 29 is threaded through a centrally located opening in the block 26 and at its outer end is provided with a relatively large diameter knurled or otherwise roughened head 30. Toward its inner end, the shank 29 is reduced in diameter as at 31 and this reduced diameter portion in the form of a neck is located in the notch 23 of the flange 22 previously described. In the assembly, it will be clear that the carrier 18 can move only longitudinally with respect to the cylindrical body 10 since it has a sliding fit with the inner walls of such body.

Additionally, the screw 29 can have no movement but a longitudinal movement with respect to the body. Therefore, as the neck portion 31 of the screw is in the notch 23 in the integral carrier flange 22, it will be clear that these parts can have no relative movement except that while the pin 25 holds the carrier against turning movement in the housing 10, the screw 29 may be turned on its own axis. Therefore, it will be understood that when the screw 29 is turned in one direction, being manipulated by the head 30, it will be fed through the closure block 26 and will move the guide or cutter carrier 18 longitudinally in the cylindrical body 10.

As such screw 29 is turned in one direction, the disc cutter 21 will be carried toward the rollers 15 and 16 and as the screw is turned in the opposite direction said disc cutter will be carried away from said rollers. Since the pin 25 limits movement of the cutter carrier 18 to the described longitudinal movement, it will be clear that when the relative position of said pin and the relative positions of the slot 24 and the disc cutter 21 are similar to those illustrated, the disc cutter is always maintained on an axis parallel with the axes 13 and 14 of the rollers 15 and 16. Thus, any pipe or any other piece of work 17 lying against these rollers, as suggested in Fig. 1, will have its axis parallel with that of the disc cutter 21 and will accordingly be normal to the plane in which such cutter may rotate or may be rotated.

When a length of tubing or pipe is cut, the same will usually have an interior bur about the cut edge. The present tool includes a reamer device 32 shown as a triangular blade having sharpened edges 33 and 34. This blade at its end opposite its point is provided with an extension 35 entering the end of the cylindrical body 10 beyond the rollers 15 and 16 and serving to rigidly mount the blade or reamer on such body. As shown, the reamer blade 32 is provided with an opening 36 which may be used for hanging the present tool on a nail, hook or the like.

It is believed the manner of use of the present tool will be understood from the description, but here it is noted that the screw 29 will be turned to withdraw the cutter carrier 18 sufficiently into the cylindrical body portion 9 so as to expose sufficient of the notch to receive the pipe, tube or rod which is to be cut. The tube or rod or pipe will be inserted into the notch so as to have the rollers 15 and 16 bear against the opposite sides of its longitudinal center line.

If the pipe or tube happens to be fixed in place or be of great length it will be clear that when the cutter is withdrawn as above suggested the present tool may be passed over the pipe, tube or rod at the point where the cut is to be made. Then the screw 29 is again operated (the knurled disc 30 providing a hand piece) so as to bring the periphery of the cutter disc 21 against such tube, pipe or rod. The screw is tightened to have the disc slightly cut into the work and then the whole tool is swung or rolled about the work which is to be cut. After one or more passes about the work, the screw 29 is again tightened and the former operation of rolling or swinging the tool about the work repeated.

The described procedure is repeated as often as necessary until the cutter has finally cut into the work severing the desired piece. Thereafter if the same size work is to be again cut, the cutter carrier 18 will be withdrawn by manipulation of the screw 29 and the operation repeated. After a piece of work has been cut, the pointed reamer or blade 32 may be inserted into the tube or pipe and the parts twisted relatively on the longitudinal axes of the present pipe cutter so as to remove any bur.

Attention is called to the fact that in my present pipe cutter the entire cylindrical body or casing 10 comprises but the desired length of a piece of wrought iron or other pipe. Thus, this body is very inexpensively produced and may be produced in any desired length and diameter. It is also noted that the carrier body or guide 18 comprises substantially a block of material and so may be inexpensively produced and has an outside diameter such as to have a sliding fit within the cylindrical body 10.

Under such circumstances, there is a relatively great area for wear between the block or cutter carrier 18 and the housing or cylindrical body 10.

Therefore, the present tool will have a long, useful life and the cutter will accurately track each time the tool is swung about the work. This is true since no small guides are provided for guiding movement of the cutter, which guides would rapidly wear and permit of lateral movements of a carrier mounting the cutter. With the present construction there will be no relative lateral movement of the carrier 18 in the body 10 except after an extremely long period of use.

Figure 7:
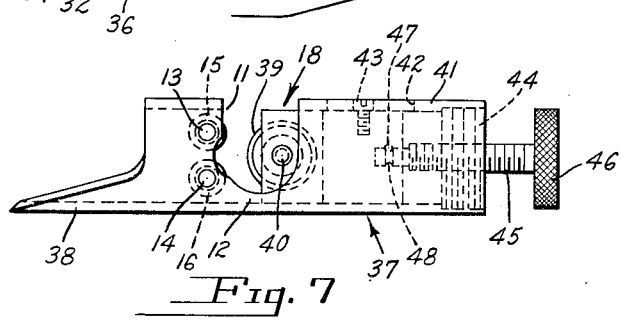
Fig. 7 is a view similar to Fig. 1 but on a smaller scale and showing a slight modification.

Referring now to the modification of Fig. 7. The tool there shown is quite similar to that above described and where the parts are the same, the same reference characters have been employed. In the modified structure, the pipe cutter of the invention includes a cylindrical body 37, the forward portion 38 of which is shaped to provide a reamer for use in removing burs in the same manner as the reamer blade 32 of Figs. 1–6 would be employed. Also, this body 37 is provided with the notch 11 and serves to mount rollers 15 and 16 entering said notch at one of its sides. In the body portion 37 at the opposite side of the notch 11 there is mounted a combined guide and disc cutter carrier 18 comprising a transversely circular block having a sliding fit with the inner walls of the described body portion. This block 18 mounts a disc cutter 39 as on a shaft 40 and such disc cutter and shaft corresponds with the disc cutter 21 and shaft 20 of the figures first described.

In its upper side the rear portion 41 of the cylindrical body 37 is provided with a longitudinally extending slot 42 in which is located the head of a screw or stud 43 rigid with the carrier 18. With this construction, it will be seen that the slot 42 and stud 43 limit movement of the carrier 18 relative to the cylindrical body portion 41 to a movement in the direction of the length of said body portion. A plug 44 is threaded into and closes the end of that portion 41 of the cylindrical body 37 which is remote from the notch 11 and threaded through such plug 44 is an externally threaded shank or screw 45 having a roughened or knurled head 46. At its inner end, the screw 45 is anchored to the carrier 18 as by a pin or the like 47 rigid with said body and entering a circular groove 48 in the inner end portion of the screw. With this arrangement, the screw is anchored to the carrier 18 against longitudinal movement relative to the latter and yet the screw may be rotated relative to the body.

With the described construction of the modification it will be clear that on manipulation of the screw 45, the carrier 18 may be shifted longitudinally in the portion 41 of the cylindrical body 37 so as to carry the disc cutter 39 toward and from the rollers 15 and 16. Thus, it will be understood that the modified construction of pipe cutter will be used in the manner of the preferred form. The essential differences in the constructions reside in the fact that the reamer blade 38 of the modification is an integral part of the cylindrical body or casing 37 of the pipe cutter, that the plug 44 is threaded into place, that the groove 42 is in the casing or housing 37 while the pin 43 is rigid with the carrier 18, and in the manner in which the inner end of the screw is connected to the carrier 18 for turning movement relative thereto but against longitudinal movement relative thereto.

Having thus set forth the nature of my invention, what I claim is:

1. In a pipe cutter, a cylindrical body having a notch opening through a side thereof intermediate its ends, a pair of rollers rotatably mounted in the body portion at the forward side of said notch and extending into the notch at opposite sides of the longitudinal center line of said body, a transversely circular cutter carrier in said body at the rearward side of said notch and having a sliding fit in such body portion for movement therein to project into and be withdrawn from said notch, a cutter mounted on said cutter carrier at the end of the latter, a rigid disc shaped closure block in and closing the rear end of said body rearwardly of said carrier, means securing said closure block to and against turning movement relative to said body, a screw threaded centrally through said closure block and connected with said carrier for turning movement relative thereto on the axis of the screw and against longitudinal movement relative thereto whereby on turning of said screw first in one direction and then in the opposite direction said carrier is shifted carrying said cutter toward and then from said rollers to engage the cutter with a pipe extending through said notch and located against said rollers, and means limiting said carrier to a straight line movement in said body.

2. In a pipe cutter, a cylindrical body of substantially uniform internal and external diameter from end to end and comprising a length of wrought iron pipe, said body having a notch opening through its side wall, a pair of rollers rotatably mounted in the body portion at the forward side of said notch and extending rearwardly of the body into said notch at opposite sides of the longitudinal center line of the body, a transversely circular cutter carrier in said body at the rearward side of said notch and of a diameter having a sliding fit in such body for movement thereinto through the rear end thereof and for movement longitudinally thereof to project into and be withdrawn from said notch, said cutter carrier transversely curved to engage with and be held against lateral movement by the side walls of said body at the lower edge of said notch whereby lateral movement of the carrier when projected into the notch is prevented, a cutter mounted on said cutter carrier at the forward end thereof and on an axis parallel with the axes of said rollers, a rigid disc shaped closure block in and closing the rear end of said body rearwardly of said carrier and insertable into and movable from said body through such rear end thereof, a screw threaded centrally through said closure block and connected with said carrier for turning movement relative to the latter on the axis of the screw and against longitudinal movement relative thereto whereby on turning of the screw first in one direction and then in the opposite direction said carrier is shifted longitudinally of said body carrying said cutter toward and then from said rollers to engage the cutter with a pipe extending through said notch and located against said rollers and to then withdraw the cutter from such a position, and means limiting said carrier to a straight line movement in said body.

3. In a pipe cutter, a cylindrical body of substantially uniform internal and external diameter from end to end and comprising a length of wrought iron pipe, said body having a notch opening through its side wall, a pair of rollers rotatably mounted in the body portion at the forward side of said notch and extending rearwardly of the body into said notch at opposite sides of the longitudinal center line of the body, a transversely circular cutter carrier in said body at the rearward side of said notch and of a diameter having a sliding fit in such body for movement thereinto through the rear end thereof and for movement longitudinally thereof to project into and be withdrawn from said notch, a cutter mounted on said cutter carrier at the forward end thereof and on an axis parallel with the axes of said rollers, a rigid disc shaped closure block in and closing the rear end of said body rearwardly of said carrier and insertable into and removable from said body through such rear end thereof, a screw threaded centrally through said closure block and connected with said carrier for turning movement relative to the latter on the axis of the screw and against longitudinal movement relative thereto whereby on turning of the screw first in one direction and then in the opposite direction said carrier is shifted longitudinally of said body carrying said cutter toward and then from said rollers to engage the cutter with a pipe extending through said notch and located against said rollers and to then withdraw the cutter from such a position, and means limiting said carrier to a straight line movement in said body.

4. In a pipe cutter, a cylindrical body, said body having a notch opening through its side wall, a pair of rollers rotatably mounted in the body portion at the forward side of said notch and extending rearwardly of the body into said notch at opposite sides of the longitudinal center line of the body, a transversely circular cutter carrier in said body at the rearward side of said notch and of a diameter having a sliding fit in such body for movement longitudinally thereof to project into and be withdrawn from said notch, said cutter carrier transversely curved to engage with and be held against lateral movement by the side walls of said body at the lower edge of said notch whereby lateral movement of the carrier when projected into the notch is prevented, a disc cutter mounted on said cutter carrier at the forward end thereof and on an axis parallel with the axes of said rollers, means for adjusting said cutter carrier longitudinally in said body portion to move said disc cutter toward and from said rollers to engage a pipe extending through said notch and located against said rollers; and cooperating means between said cutter carrier and said body and limiting movement of the former in the latter to a straight line movement.

ARTHUR S. CANN.

REFERENCES CITED

The following references are of record in the file of this patent:

UNITED STATES PATENTS

| Number | Name | Date |
| --- | --- | --- |
| 76,729 | Galleford | Apr. 14, 1868 |
| 660,584 | Norman | Oct. 30, 1900 |
| 2,126,951 | Dobrick | Aug. 16, 1938 |